March 20, 1945.  F. W. CHRISWELL ET AL  2,371,802
ENDLESS TRACTION BELT
Filed May 20, 1943  2 Sheets-Sheet 1
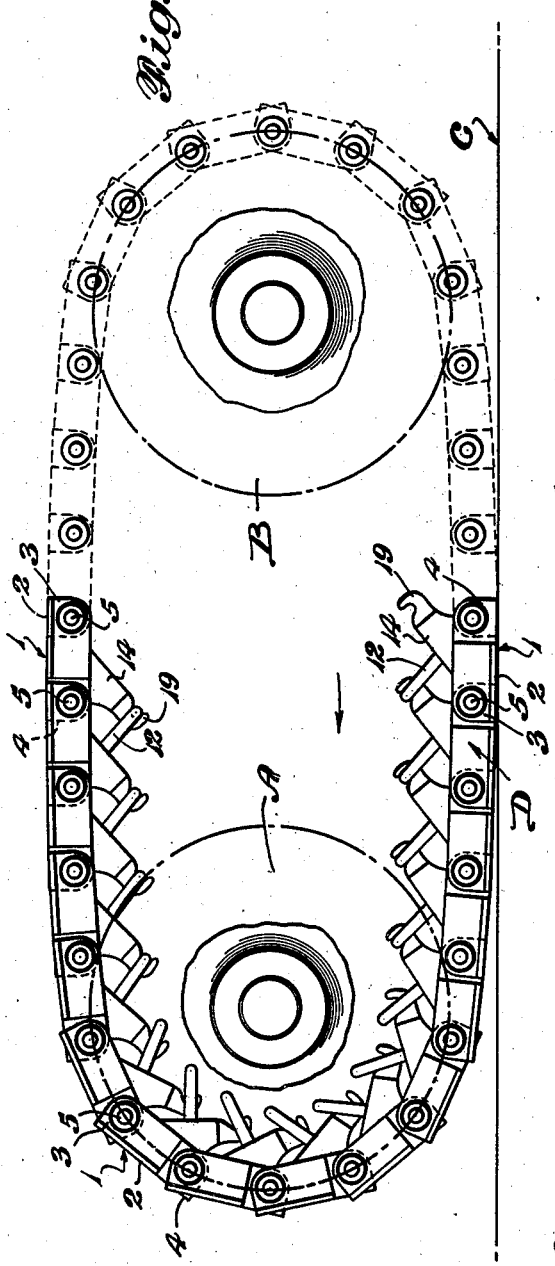
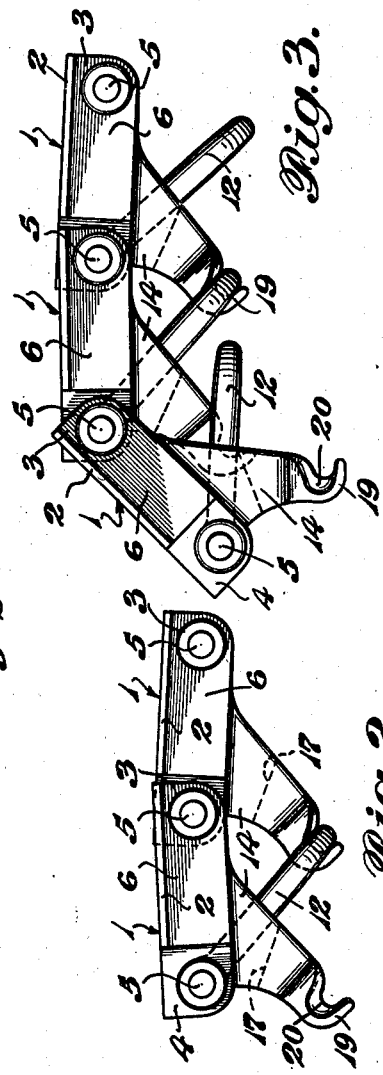
Inventor
FREDERICK W. CHRISWELL AND
ROBERT S. LANSDON.
By Ralph S. Barrett
Attorney

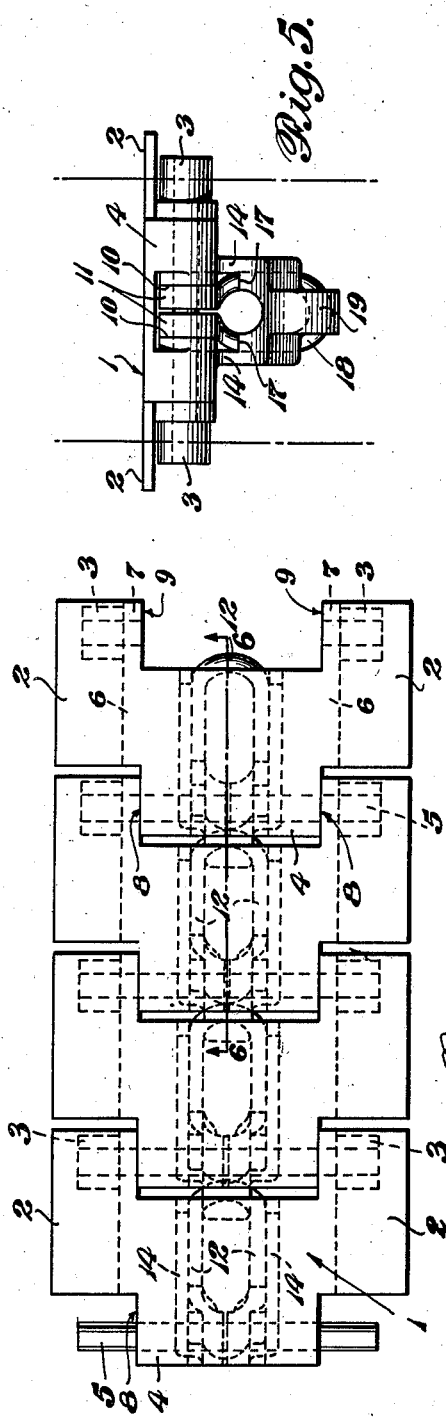

Patented Mar. 20, 1945

2,371,802

UNITED STATES PATENT OFFICE 2,371,802

ENDLESS TRACTION BELT

Frederick W. Chriswell and Robert S. Langdon, Seattle, Wash.

Application May 20, 1943, Serial No. 487,756

11 Claims. (Cl. 305—10)

This invention relates to an endless traction belt composed of pads or shoes hinged at their edges with rail members for load carrying wheels and means to truss the pads and prevent them from buckling inward, such means composed of a projecting arm terminating in a hook to engage a stirrup which is anchored at the hinge pin. The stirrup is pivoted on the hinge pin of one pair of pads and engages the hook member of the adjacent pad.

The primary purpose of this invention is to construct endless track linkage to form track laying wheel substitutes capable of convenient field repair without the use of special tools and equipment.

One of the objects of this invention is to form a link-shoe and truss-arm construction by casting, so that this assembly can be properly hardened to resist wear, and to utilize with this unit a forged stirrup of a softer metal to permit faster wear of this part for convenient and inexpensive replacement. As an example the casting may be or "carcometal" heat treated to suitable hardness, while the stirrup and hinge pin therefor are drop-forged. An S. A. E. 1040 may be indicated for this.

A further object of the present invention is to so locate the stirrup that the stress developed in the truss is lower than in conventional assemblies thus reducing materially the wear on this member.

More specifically, this invention contemplates the use of a tread link unit comprising a pad, or shoe and integral truss arm and hook, and a stirrup hinged thereto, the hook with its curved outer extremity engaging the curved free end of the adjacent stirrup to provide the essential freedom of movement so as to adjust itself and, thus eliminate expensive machining of any kind at the wear point. Both the pad or shoe, with its integral hook, and the stirrup will be so dimensioned as to incorporate a "camber" in the new assembled belt. Use of the belt will eventually eliminate the "camber" due to wear of the working faces until the belt will be substantially flat, or a slight reverse "camber" is formed. When this occurs, replacement of the stirrups will return the belt to its original "camber," minus the wear on the hook member.

By the foregoing constructions, the specified objects among others will be accomplished. Other objects will hereinafter appear by reference to the accompanying drawings and specification wherein like reference characters designate corresponding parts throughout the several views, in which:

Fig. 1 is a side elevation of a track laying wheel and running gear embodying my invention and illustrating the beams formed by the link stretches.

Fig. 2 is a side elevation of a track section with the pads in relative position before the parts are worn.

Fig. 3 is a similar view with one of the links moved to full "bent" position.

Fig. 4 is a top plan of a track section.

Fig. 5 is an end elevation of a link showing the stirrup hinge.

Fig. 6 is a longitudinal section of line 6—6 of Fig. 4, and

Fig. 7 is a bottom plan view of a pair of connected links.

Referring, particularly, to Fig. 1, there is illustrated a track laying assembly to which the wheels A—B may be of conventional design and, therefore, are merely illustrated diagrammatically. The present construction is such that it may be adapted to any standard running gear and, consequently, is suitable for either original installation or replacement in other equipment. In Fig. 1 it will be apparent that the units are so constructed and dimensioned that the track stretches embody a "camber." The ground line C and the ground stretch D showing this feature, the details of which will more clearly hereinafter appear by a detailed examination of the individual link assemblies.

The link assemblies each comprehend a traction pad or shoe 1 formed with wheel carrying raid surfaces 2 and forwardly and rearwardly extending pairs of spaced lugs 3 and 4, respectively.

The forward lugs 3 are relatively spaced to receive between them the rearwardly extending spaced lug 4 of the next adjacent link and each lug is formed with a transverse opening so formed and arranged that all openings will be aligned in assembly to permit the insertion of a hinge pin 5 as is usual in such constructions. It will be noted that the forward lugs 3 extend laterally from the side walls 6 of the shoe 1 and underlie the rail portions 2 adjacent the ends thereof. These lugs 3 and the depending flanges 7 which reinforce the forward end of the rail portions 2 tend to strengthen the assembly and form the essential bearing structure for the extremities of the hinge pins 5. The rear lugs 4 are so spaced that their outer faces 8 will engage snugly between the inner faces 9 of the forward lugs of the next adjacent links. The inner faces 10 of the lugs 4 are spaced to receive the eye terminals 11 of the elongated stirrups 12 as shown more clearly in Fig. 5.

The trussing of the shoes or pads to prevent inward buckling is accomplished by casting with the shoe or pad the spaced wall 14 which extends substantially the length of the inner face of the shoe and in parallel relation. These walls 14 are formed with inwardly extending angularly arranged shoulders 17 which act as limit stops for defining the outward movement of the stirrup 12 while the lateral guiding action is provided by the walls themselves, between which the stirrup is confined. Outwardly of the shoulders 17 the walls 14 merge into the hooked extremity 19 which is located outwardly of the vertical axial plane of the pivot pin 5. The concave working face 20 of the hook 19 is shaped to permit proper seating of the relatively heavy curved end 18 of the stirrup 12, which end portion is constructed to absorb a maximum portion of the wear as between these parts.

The stirrups 12 are preferably drop-forged to provide a relatively elongated body terminating at one end in the eyelets 11 and at the other end in the rounded, relatively thickened outer end portion 18 which as stated is designed to engage the curved socket 19 formed in the outer end portion of the curved hook 20 of the truss member. By this construction the working faces between the hooked truss member and the free end 18 of the loop or stirrup are curved to provide necessary freedom of movement so that these parts will be self-adjusting and so that the desired relative movement between the parts may be obtained without a machining operation.

The shoe or pad 1, with the rail members for the load carrying walls, and the truss member, including the hook, are cast as a unit, this unit likewise embodying the lugs formed with the pin receiving openings. The casting is preferably made of a metal which may be heat treated to secure desirable hardness while the stirrup 1 is drop-forged and therefor relatively soft. By this construction it will be apparent that the wear will be essentially on the drop-forged member, which member is readily replaceable by the simple expedient of removing the hinge pin. Thus, the life of the cast unit is materially lengthened and the use of essential materials eliminated.

In the construction of the parts i. e., the casting and the stirrup, it is intended that there be sufficient freedom of movement so that the necessary seating between the stirrup and the truss will be accomplished. The clearances and dimensions between the casting and the stirrup are such that when the link belt is originally assembled, a camber is formed in the belt, this camber becoming less as the stirrup is worn at its point of engagement with the hook until the belt is relatively flat or the camber is slightly in reverse. When this condition exists the stirrup can be replaced thus assembling the belt in its original camber less a small amount of wear which has occurred on the hook at its point of engagement with the stirrup.

In the prior art there are two general types of track belts each of which has distinct disadvantages. In one type field repair is practically impossible without special tools and equipment which obviously is extremely unsatisfactory under many working conditions. In this type the track pad has two arms spaced fore and aft, which constitute the parts that form the truss, one arm terminates in a hook and the other in an eye to receive a pin. The hook of one pad engages the pin of the adjacent pad preventing the hinge from further movement and thus forming the truss. To prevent the wear coming all on one place of the pin, it is loose and allowed to float. The arm with the eye is bifurcated and the two parts are spaced apart and a bushing is placed on the pin and shrunk on to prevent the endwise movement of the pin. To remove the pin for repair, a torch is required to heat the bushing and expand it to loosen the pin. On account of the hook engaging a pin, exact machining is imperative to secure the required contact surface and distribute the stress and wear equally. Any misalignment of parts would be detrimental. The fact that there are two hooks to contact the ends of the truss pin, any unequal wear would complicate replacements, as the two hooks must contact the pin at the same time.

The other conventional design is such that high stresses are developed in the links and hook-links that form the truss which necessitates the use of alloys essential to the war industry, and also demands an exact technique in manufacture. The hook-links have tapered shanks where they enter the pad and this taper should be polished to remove tool marks and thus forestall early fatigue which is common to taper fits. When new wheels are put into service the nuts on the hook-links should be frequently tightened until properly seated. A special socket wrench is necessary to reach the nuts.

The present invention eliminates these objections and provides an assembly in which field repair can be made and perhaps what is more important the wear is primarily confined to a single inexpensive element which is constructed and arranged for quick replacement.

In use it will be obvious to one skilled in the art that due to the method of manufacture the wear will mostly be at the outer end of the stirrup, which incidentally is formed relatively thicker at this point so that at all times it will possess the necessary strength. When the stirrup is so worn at this point that the camber is substantially eliminated or reversed, then by simply removing the hinge pin a new stirrup may be included in the assembly. This will inherently return the camber, except for that minimum amount represented by the wear of the hardened hooked truss. By this means a substantially greater use of a tread unit is possible without the loss of desirable features, and expense and loss of time is kept at a minimum.

What I claim is:

1. In a tread linkage, a pair of links having shoe parts, hinge means connecting said parts for relative co-axial movement, said links having truss forming elements upstanding from said shoe parts when the latter are in ground engaging position, said truss elements including spaced walls and an extremity defining a hook, and means pivotally mounted on the hinge means for engaging the hooked portion of the truss of the adjacent shoe.

2. In a tread linkage, a pair of links having shoe parts, hinge means including a hinge pin connecting said parts for relative co-axial movement, said links having truss forming elements upstanding from said shoe parts when the latter are in ground engaging position, said truss elements including a wall portion adjacent said shoe and an extremity defining a hook, and stirrup means pivotally mounted on the hinge means for engaging the hook of the truss of the adjacent shoe.

3. In a tread linkage, a pair of links having shoe parts, hinge means connecting said parts for relative movement, said links each having truss forming elements upstanding from said shoe parts when the latter are in ground engaging position, said truss elements each including spaced wall portions and an extremity formed with a hook portion, and an element pivoted to said hinge means and extending between the spaced walls of the adjacent truss element for engaging the hooked portion of the truss element of the adjacent shoe for transmitting truss forming stresses between links.

4. In a tread linkage, a pair of links having shoe parts, hinge means including a removable pin connecting said parts for relative movement, said links each having truss forming elements upstanding from said shoe parts when the latter are in ground engaging position, said truss elements each including spaced wall portions and an extremity formed with a hook portion, and a stirrup pivotally mounted on said hinge pin and extending between the spaced walls of the adjacent truss element for engaging the hooked portion of the truss element of the adjacent shoe for transmitting truss forming stresses between links.

5. In a tread linkage, a pair of links having shoe parts, hinge means connecting said parts for relative movement, said links each having truss forming elements upstanding from said shoe parts when the latter are in ground engaging position, said truss elements each including spaced wall portions and an extremity formed with a hook portion, an element pivoted to said hinge means and extending between the spaced walls of the adjacent truss element for engaging the hooked portion of the truss element of the adjacent shoe for transmitting truss forming stresses between links, and means for limiting the hinge movement of said pivoted element.

6. In a tread linkage, a pair of links having shoe parts, hinge means including a removable pin connecting said parts for relative movement, said links each having truss forming elements upstanding from said shoe parts when the latter are in ground engaging position, said truss elements each including spaced wall portions and an extremity formed with a hook portion, an element pivoted to said hinge pin and extending between the spaced walls of the adjacent truss element of the adjacent shoe for transmitting truss forming stresses between links, and shoulders projecting from said walls for engaging said pivoted element to limit its outward hinged movement.

7. A tread linkage comprising hinged shoe members each having truss extension to prevent inward bending, said tread members and trusses being formed of hardened material and said trusses each including a curved bearing portion and a removable hinged stirrup formed of relatively softer material for connecting said hinges and truss bearing portions for transmitting truss forming stresses, whereby the wear will accumulate at the removable part.

8. In a tread linkage of the class described, a pair of links each having shoe parts and truss forming parts, said truss forming part including a bearing portion of hardened material, hinge means connecting said links, and removable stirrup means pivoted on said hinge means, said stirrup means being formed of relatively softer material than said bearing portion and engaging the adjacent truss for guided movement and the truss of the adjacent link at its bearing portion for transmission of truss forming stresses between links, whereby said stirrup may be replaced upon accumulation of excessive wear.

9. A vehicle track chain formed of a plurality of shoes, each comprising a tread member having hinge lugs projecting from the opposite sides thereof, pintles for pivotally connecting the hinge lugs of adjacent shoes, means for trussing said shoes including integral extensions extending upwardly and rearwardly when said track chain is in ground engaging position of said truss, means including spaced walls formed with inwardly projecting shoulders, and said walls merging to form an extremity having a hook shaped portion, and stirrup means mounted on the hinge pin of one pair of shoes and extending between the walls of the adjacent truss means and engaging the hook shaped portion of the adjacent shoe, said stirrup being limited in its movement by the shoulder of the adjacent truss means.

10. The structure set forth by claim 9 further characterized in that the engaging faces between the stirrup and truss are respectively convex and concave shaped to insure relative movement and adjustment.

11. A vehicle track chain formed of a plurality of cast units each including a tread member, hinge lugs at opposite sides, and a truss means terminating in a hook shaped portion, said unit being hardened to be wear resisting, hinge pins connecting said units, and a removable stirrup pivoted on the hinge pin of one unit and engaging the hooked portion of the adjacent truss, said stirrup being formed of relatively soft material.

FREDERICK W. CHRISWELL.
ROBERT S. LANGDON.